(12) United States Patent
Thom et al.

(10) Patent No.: US 10,558,812 B2
(45) Date of Patent: Feb. 11, 2020

(54) MUTUAL AUTHENTICATION WITH INTEGRITY ATTESTATION

(71) Applicant: Microsoft Technology Licensing, LLC, Redmond, WA (US)

(72) Inventors: Stefan Thom, Snohomish, WA (US); Torsten Stein, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 15/629,114

(22) Filed: Jun. 21, 2017

(65) Prior Publication Data

US 2018/0373881 A1    Dec. 27, 2018

(51) Int. Cl.
| | | |
|---|---|---|
| *H04L 29/06* | (2006.01) | |
| *G06F 21/60* | (2013.01) | |
| *H04L 9/06* | (2006.01) | |
| *H04L 9/14* | (2006.01) | |
| *H04L 9/30* | (2006.01) | |
| *H04L 9/08* | (2006.01) | |
| *G06F 21/72* | (2013.01) | |

(52) U.S. Cl.
CPC ............ *G06F 21/602* (2013.01); *G06F 21/72* (2013.01); *H04L 9/0643* (2013.01); *H04L 9/0894* (2013.01); *H04L 9/14* (2013.01); *H04L 9/30* (2013.01); *H04L 2209/127* (2013.01)

(58) Field of Classification Search
CPC .............................. G06F 21/602; H04L 9/0643
USPC ......................................................... 713/193
See application file for complete search history.

(56) References Cited

U.S. PATENT DOCUMENTS

| | | | |
|---|---|---|---|
| 4,799,258 A | | 1/1989 | Davies |
| 5,343,527 A | * | 8/1994 | Moore .................... G06F 21/16 |
| | | | 380/30 |
| 5,666,414 A | | 9/1997 | Micali |
| 5,799,086 A | | 8/1998 | Sudia |
| 6,118,874 A | | 9/2000 | Okamoto et al. |

(Continued)

FOREIGN PATENT DOCUMENTS

| | | |
|---|---|---|
| CA | 2597209 A1 | 10/2008 |
| CN | 106899583 A | 6/2017 |

(Continued)

OTHER PUBLICATIONS

Green, Matthew, "Multiple encryption", https://blog.cryptographyengineering.com/2012/02/02/multiple-encryption/, Published on: Feb. 2, 2012, 6 pages.

(Continued)

*Primary Examiner* — Longbit Chai
(74) *Attorney, Agent, or Firm* — Holzer Patel Drennan

(57) ABSTRACT

A device is configured with a trusted platform module (TPM) executing in a trusted execution environment (TEE). Software/firmware updates, user data, applications, etc. are pushed to the device as a payload. The payloads contain a sealed container (e.g., the software/firmware update, user data, applications, etc.), one or more policies, and one or more provisioning code segments corresponding to the one or more policies. The policies are checked by the TPM of the device. If the measurement of the one or more provisioning code segments satisfy the one or more policies, then the sealed container is unsealed by the TPM and released to the device.

20 Claims, 9 Drawing Sheets

(56) References Cited

U.S. PATENT DOCUMENTS

| | | | |
|---|---|---|---|
| 6,141,423 A | 10/2000 | Fischer | |
| 6,253,193 B1 * | 6/2001 | Ginter | G06F 21/10 |
| | | | 348/E5.006 |
| 6,684,330 B1 | 1/2004 | Wack et al. | |
| 6,976,163 B1 | 12/2005 | Hind et al. | |
| 7,257,844 B2 | 8/2007 | Woodward | |
| 7,350,072 B2 | 3/2008 | Zimmer et al. | |
| 7,350,083 B2 | 3/2008 | Wells et al. | |
| 7,499,551 B1 | 3/2009 | Mire | |
| 7,580,521 B1 | 8/2009 | Spies et al. | |
| 8,041,957 B2 | 10/2011 | Michaelis et al. | |
| 8,200,988 B2 | 6/2012 | Gass et al. | |
| 8,578,153 B2 | 11/2013 | Johansson et al. | |
| 8,606,945 B2 | 12/2013 | Merkow et al. | |
| 8,621,218 B2 | 12/2013 | Kwon et al. | |
| 8,850,543 B2 | 9/2014 | Von Bokern et al. | |
| 8,903,370 B2 | 12/2014 | Yerrabommanahalli et al. | |
| 9,043,827 B1 | 5/2015 | Rapoport et al. | |
| 9,118,486 B2 | 8/2015 | Pritikin | |
| 9,235,696 B1 | 1/2016 | Nien et al. | |
| 9,306,913 B1 | 4/2016 | Volkov | |
| 9,419,951 B1 | 8/2016 | Felsher et al. | |
| 9,467,293 B1 | 10/2016 | Brainard et al. | |
| 2002/0093915 A1 | 7/2002 | Larson | |
| 2003/0084332 A1 | 5/2003 | Krasinski et al. | |
| 2003/0126439 A1 | 7/2003 | Wheeler et al. | |
| 2004/0127196 A1 | 7/2004 | Dabbish et al. | |
| 2006/0282901 A1 | 12/2006 | Li et al. | |
| 2007/0003064 A1 | 1/2007 | Wiseman et al. | |
| 2008/0066095 A1 | 3/2008 | Reinoso | |
| 2008/0069350 A1 | 3/2008 | Reinoso et al. | |
| 2008/0162947 A1 | 7/2008 | Holtzman et al. | |
| 2008/0215474 A1 | 9/2008 | Graham | |
| 2009/0044015 A1 | 2/2009 | Gantman et al. | |
| 2009/0208015 A1 | 8/2009 | Kamat et al. | |
| 2010/0266132 A1 | 10/2010 | Bablani et al. | |
| 2011/0179268 A1 | 7/2011 | Strom et al. | |
| 2012/0099727 A1 | 4/2012 | Marshall et al. | |
| 2012/0137137 A1 | 5/2012 | Brickell et al. | |
| 2012/0173885 A1 | 7/2012 | Acar et al. | |
| 2012/0255010 A1 | 10/2012 | Sallam | |
| 2012/0295618 A1 | 11/2012 | Ahmavaara et al. | |
| 2013/0091556 A1 | 4/2013 | Horn et al. | |
| 2013/0283381 A1 | 10/2013 | Thadikaran et al. | |
| 2014/0143412 A1 | 5/2014 | Martinez perea et al. | |
| 2014/0281485 A1 | 9/2014 | Ganesan | |
| 2015/0019875 A1 | 1/2015 | Barbiero et al. | |
| 2015/0052610 A1 | 2/2015 | Thom et al. | |
| 2015/0074402 A1 | 3/2015 | D'souza et al. | |
| 2015/0312041 A1 | 10/2015 | Choi | |
| 2015/0341791 A1 | 11/2015 | Yang et al. | |
| 2016/0021635 A1 | 1/2016 | Lee et al. | |
| 2016/0044012 A1 | 2/2016 | Carrer et al. | |
| 2016/0054989 A1 | 2/2016 | Diebolt et al. | |
| 2016/0099969 A1 | 4/2016 | Angus et al. | |
| 2016/0205078 A1 | 7/2016 | James et al. | |
| 2016/0226870 A1 | 8/2016 | Chiu et al. | |
| 2016/0270020 A1 | 9/2016 | Adrangi et al. | |
| 2016/0294828 A1 | 10/2016 | Zakaria | |
| 2016/0330182 A1 | 11/2016 | Jeon et al. | |
| 2016/0342798 A1 | 11/2016 | Smith et al. | |
| 2016/0379220 A1 | 12/2016 | Tunnell et al. | |
| 2017/0005871 A1 | 1/2017 | Smith et al. | |
| 2017/0006003 A1 | 1/2017 | Zakaria et al. | |
| 2017/0024569 A1 | 1/2017 | Xing et al. | |
| 2017/0024570 A1 | 1/2017 | Pappachan et al. | |
| 2017/0063566 A1 | 3/2017 | Seminario et al. | |
| 2017/0063811 A1 | 3/2017 | Hitchcock et al. | |
| 2017/0142082 A1 | 5/2017 | Qian | |
| 2017/0149564 A1 | 5/2017 | Mccallum | |
| 2017/0170957 A1 | 6/2017 | Smith et al. | |
| 2018/0375655 A1 | 12/2018 | Thom et al. | |
| 2018/0375665 A1 | 12/2018 | Contenti et al. | |
| 2018/0375852 A1 | 12/2018 | Thom et al. | |

FOREIGN PATENT DOCUMENTS

| | | |
|---|---|---|
| WO | 03098869 A1 | 11/2003 |
| WO | 2016172492 A1 | 10/2016 |
| WO | 2016200597 A1 | 12/2016 |

OTHER PUBLICATIONS

Arthur et al., "A Practical Guide to TPM 2.0, Using the Trusted Platform Module in the New Age of Security", In Master Security Concepts Using TPM 2.0, Aspress Open, Originally published on Jan. 24, 2015, 375 pages.

Wang, Yingmei, "Middleware Technology Research and Interface Design Based on Internet of Things", In International Journal of Smart Home, vol. 9, No. 12, Dec. 30, 2015, pp. 35-44.

Does F-Secure KEY use double encryption to protect my KEY data?, https://community.f-secure.com/t5/F-Secure-KEY/Does-F-Secure-KEY-use-double/ta-p/80971, Retrieved on: Apr. 18, 2017, 2 pages.

"AllJoyn™ Security 2.0 Feature High-Level Design", Retrieved from: https://web.archive.org/web/20170730231028/https://allseenalliance.org/framework/documentation/learn/core/security2_0/hld, Aug. 29, 2017, 53 Pages.

"Device Pairing Kinds Enum", Retrieved from: https://docs.microsoft.com/en-us/uwp/api/windows.devices.enumeration.devicepairingkinds, Aug. 29, 2017, 2 Pages.

"OCF Security Specification V1.0.0", Retrieved from: https://openconnectivity.org/draftspecs/OCF_Security_Specification_v1.0.0.pdf, Aug. 29, 2017, 104 Pages.

"TCG Infrastructure Working Group Reference Architecture for Interoperability (Part 1)", Retrieved From: https://trustedcomputinggroup.org/wp-content/uploads/IWG_Architecture_v1_0_r1.pdf, Jun. 16, 2005, 66 Pages.

Abelson, et al., "The Risks of Key Recovery, Key Escrow, and Trusted Third-Party Encryption", In World Wide Web Journal—Special Issue: Web Security: A Matter of Trust, vol. 2, Issue 3, Jun. 1, 1997, 20 Pages.

Feller, Thomas, "Towards Trustworthy Cyber-Physical Systems", In Publication of Springer, Aug. 25, 2014, 2 Pages.

Gallery, et al., "Trusted Mobile Platforms", In Proceedings of the Foundations of Security Analysis and Design IV, Aug. 18, 2007, 43 Pages.

Hu, Fei, "Wireless Embedded Microsystems", In Publication of CRC Press, Sep. 26, 2013, 1 Page.

Konstantinou, et al., "Cyber-Physical Systems: A Security Perspective", In Proceedings of 20th IEEE European Test Symposium, May 25, 2015, 8 Pages.

"International Search Report and Written Opinion Issued in PCT Application No. PCT/US18/033578", dated Jul. 31, 2018, 12 Pages.

"International Search Report and Written Opinion Issued in PCT Application No. PCT/US18/033579", dated Jul. 24, 2018, 14 Pages.

"International Search Report and Written Opinion Issued in PCT Application No. PCT/US18/033580", dated Jul. 30, 2018, 12 Pages.

"International Search Report and Written Opinion Issued in PCT Application No. PCT/US18/033581", dated Aug. 23, 2018, 12 Pages.

"Non Final Office Action Issued in U.S. Appl. No. 15/629,139", dated Jan. 31, 2019, 10 Pages.

"Non Final Office Action Issued in U.S. Appl. No. 15/629,064", dated Apr. 18, 2019, 15 Pages.

"Non Final Office Action Issued in U.S. Appl. No. 15/629,086", dated Apr. 5, 2019, 14 Pages.

"Final Office Action Issued in U.S. Appl. No. 15/629,086", dated Sep. 30, 2019, 14 Pages.

"Non-Final Office Action Issued in U.S. Appl. No. 15/629,064", dated Oct. 30, 2019, 19 Pages.

* cited by examiner

MUTUAL AUTHENTICATION WITH INTEGRITY ATTESTATION

BACKGROUND

Consumer devices are increasingly configured with sensors, electronics, and networking capabilities to provide enhanced user experiences. Such devices utilize different software/firmware, applications, etc. to provide these enhanced experiences. Because the devices are connected to the network (e.g., via Wi-Fi, Ethernet, cellular network), cloud services push software/firmware updates to the device. Bad actors (e.g., hackers/malware) that have gained access to such devices are able to intercept such updates and falsely confirm updates to the device manufacturers or software providers.

SUMMARY

In at least one implementation, a device includes a payload interface configured to receive a payload containing a sealed container, one or more provisioning code segments, and one or more policies based on the one or more provisioning code segments and corresponding to the sealed container. The device further includes a trusted computing manager configured generate one or more measurements of the one or more provisioning code segments according to the one or more policies, determine whether the generated one or more measurements satisfy the one or more policies, and unseal the sealed container responsive to the generated one or more measurements satisfying the one or more policies received in the payload. Satisfaction of the one or more policies confirms integrity of the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
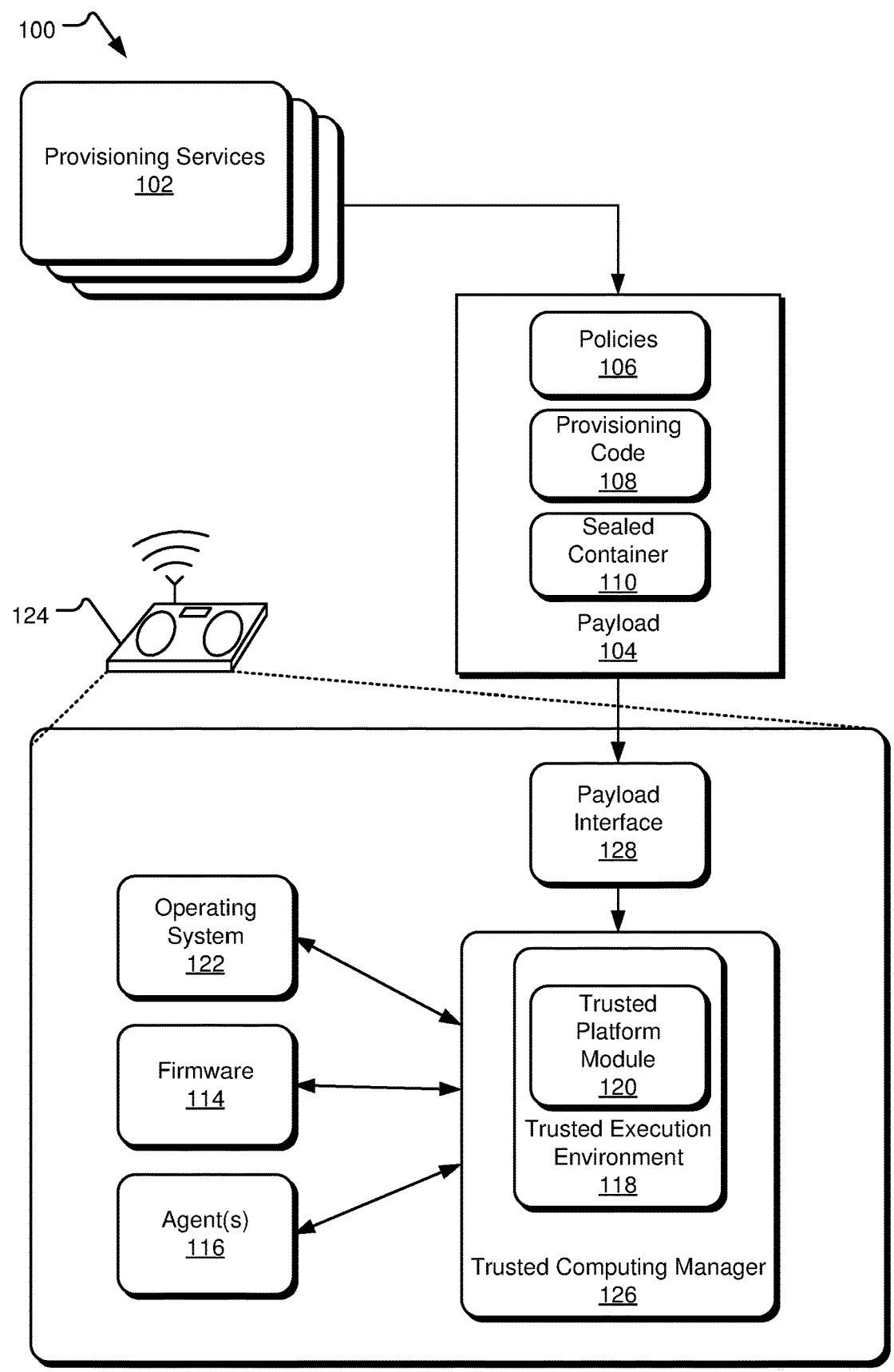
FIG. 1 illustrates an example block diagram of device authentication using policies based on provisioning code.

Consumer devices are increasingly configured with sensors, electronics, and networking capabilities to provide enhanced user experiences. Such devices utilize different software/firmware, applications, etc. to provide these enhanced experiences. Because the devices are connected to the network (e.g., via Wi-Fi, Ethernet, cellular network), cloud services push software/firmware updates to the device. The updates are provided to patch a security hole, fix a bug, or to enhance functionality. Generally, the updates are signed with a manufacturer or software provider key such that the device can that the update is received from an approved party. However, a bad actor (e.g., hacker/malware) that has control of the device may be able to falsely sign bad piece of software with the manufacturer/software provider key. Furthermore, the bad actor may send a deceptive confirmation back to the manufacturer/software provider that the pushed update was successfully installed. Furthermore, bad actors are able to detect differences between old software and new software to find the updates and exploit a new security patch, for example. Bad actors are further able to gain access to secure portions of these devices (e.g., trusted execution environment) and utilizes private keys to decrypt received encrypted payloads. These bad actors may further access private user data, user configuration data (e.g., Wi-Fi credentials), etc.

Implementations described herein include a smart device, connected device, IoT device, etc. configured with a trusted platform module (TPM) executing in a trusted execution environment (TEE). Software/firmware updates, user data, applications, etc. are pushed to the device as a payload. The payloads contain a sealed container (e.g., the software/firmware update, user data, applications, etc.), one or more policies, and one or more provisioning code segments corresponding to the one or more policies. The one or more provisioning code segments may be one or more agent code segments, which are code segments that implement some functionality or utilize some sensor implemented in the device. The one or more provisioning code segment may also be the code segments included in the sealed payload. The one or more policies include commands and/or conditions that must be satisfied before the device is able to unseal (e.g., release the sealed container to the device) the sealed container. The one or more policies are based at least on a measurement of the one or more provisioning code segments and may be based an output of execution of the one or more provisioning code segments. The policies are checked by the TPM of the device. If the measurement of the one or more provisioning code segments do not satisfy the policy, then the device is unable to unseal the sealed container and install the updates, utilize the data, etc. In other words, if the policies are not satisfied, the device may be compromised. If the policies are satisfied, the sealed container is unsealed and the device can install the updates, utilize the data, etc.

FIG. 1 illustrates an example block diagram 100 of device authentication using policies based on provisioning code. The block diagram 100 includes one or more provisioning services 102 (hereinafter "the provisioning service 102") that are configured to provision smart devices, such as the smart scale 124. Provisioning refers to providing customer or device specific configuration data (e.g., device setup information), software/firmware updates, customer data, customer applications, functionality data, etc. to the devices. The provisioning service 102 may be associated with a manufacturer or a device, a vendor, a stand-alone service, etc. The provisioning service 102 may have access to or manage user accounts and may manage or document devices using public keys associated with devices. The provisioning service 102 manages or documents ownership of such devices using the public key associated with the device.

In the illustrated implementation, the smart scale 124 includes firmware 114, and one or more agents 116, an operating system 122, and a trusted execution environment (TEE) 118. The agents 116 are code modules for operating one or more sensors, functionalities, etc. on the device. For example, a GPS sensor on the smart scale 124 includes agent code for operating the GPS sensor. Similarly, a temperature sensor includes agent code for operation of the temperature sensor. In another example implementation, one or more agent code segments are used to operate a Wi-Fi transceiver. Other agent segments are utilized for different functionality, such as, for example, code for weighing the user, displaying past user data at a user interface, etc. The device includes a trusted execution environment (TEE) 118 that communicates with a trusted platform module (TPM) 120. It should be understood that there may be more than one TPM 120.

The TPM 120 may be a microcontroller, such as a discrete silicon component in a semiconductor package, an integrated component incorporated in one or more semiconductor packages, or the TPM 120 may be a firmware based TPM running in a TEE on a general-purpose system on chip (SoC). In the illustrated implementation, the TPM 120 is a firmware based TPM executed in the TEE 118. However, it should be understood that the TPM 120 may be a microcontroller executed in a trusted computing manager 126. The instructions for TEE 118 may be stored in read only memory (ROM) or write once read many memory (WORM) and is separated from the rest of the programs (e.g., the operating system 122, firmware 114, agent 116) that are executing on a CPU of the device. Accordingly, secrets like private keys needed by the TPM 120 are not accessible by other programs unless the keys are authorized to be used by other programs or certain conditions are satisfied. The TPM 120 securely stores passwords, digital keys, and certificates, that provide unique identification and authentication. The TPM 120 may include or have access to non-volatile storage that stores keys and authorization data. The TPM 120 further includes one or more platform configuration registers (PCRs) that store measurements of the software 112 (including the agents 116, the firmware 114, and/or the operating system 122). The TPM 120 may further include one or more engines for encryption and hashing. For example, the TPM 120 includes a random number generator, a hashing engine (e.g., SHA-2), a key generator, a RSA engine, etc. The TPM 120 further includes an execution engine for executing different functionalities in the TPM 120.

When the smart scale 124 is booted, the boot code that is loaded (including the operating system and the firmware 114) are measured and recorded as integrity measurements in one or more of the PCRs of the TPM 120. The measurements are generated at the trusted computing manager 126 (and may be generated by the TEE 118). These measurements can be used as evidence for how a system started and to make sure that a TPM 120 based key is used only when the correct software (e.g., the software 112) was used to boot the system. Restricting utilization of a key based on the correct boot code starting the system is called "sealing" a key. The key seal is based on one or more policies. These policies direct the TPM 120 of what measurements to make or receive. If the measurements satisfy a policy (e.g., if a number of conditions are met), then the key is unsealed and may be used for an operation. Satisfaction of a policy is based on the measurements.

The one or more policies define a set of one or more controls or conditions that must be met before actions are authorized on a TPM 120 entity. The one or more controls or conditions can be combined using AND and OR combinations. An authorization policy digest is created by a combination of assertions (e.g., conditions). The authorization policy digest may be created outside the TPM 120 using software that emulates the policy calculations done on the TPM 120. In such implementations, the authorization policy digest may be created by the provisioning service 102 and sent with the payload 104. In other implementations, a trial policy can be created with the TPM. In a trial policy, the assertions (controls and/or conditions) pass and the authorization policy digest is created.

After the authorization policy digest is created, the one or more controls or conditions (e.g., policy commands) are sent to the TPM 120 and the TPM 120 hash-extends the commands to create a TPM policy digest. An authorization command (e.g., such as unseal the sealed container 110) is sent to the TPM 120. The TPM 120 determines whether the TPM policy digest matches the authorization policy digest. If so, the command is authorized and executed. In this example implementation, the sealed container 110 is unsealed by the authorization command. If the TPM policy digest does not match the authorization policy digest, then the authorization fails and the authorization command is not executed (e.g., the sealed container 110 is not unsealed).

It should be understood that the one or more policies 106 define commands to initiate a policy session, commands that are checked (e.g., measurements received), and the authorization command (e.g., unseal the sealed container 110). Furthermore, the one or more policies 106 may include the authorization policy digest if the authorization policy digest is created outside the TPM 120. Accordingly, the implementations described below that discuss determining whether the policies are "satisfied" include the operations described to create an authorization policy digest, process commands to create a TPM policy digest, and determine whether the digests match.

Furthermore, a command to "unseal" the sealed container 110 may be specified by authorizing an entity within the TPM 120, such as a key, to be utilized by an entity outside the TPM (e.g., the TEE 118 and/or the trusted computing manager 126). Thus, the implementations described that discuss "unsealing" the sealed container may include steps such as migrating a decryption key outside the TPM 120.

The provisioning information (e.g., data, software/firmware updates, applications) are send to the smart scale 124 as a payload 104. The payload 104 includes one or more policies 106, one or more provisioning code segments (provisioning code 108), and a sealed container 110. The sealed container 110 contains the provisioning information prepared for the device. The provisioning code 108 may code specific to one or more agents/functionality and thus may be considered one or more agent code segments. The sealed container 110 is released to the device if the one or more policies are satisfied. Thus, the payload 104 is received by a payload interface 128 of the device, and the provisioning code 108 is loaded in the agent(s) 116. The agent code 108 is executed by the smart scale 124 and generates an output which is communicated to the TPM 120 through the trusted computing manager 126. The TPM 120 receives a number of measurements, including at least a measurement of at least the received provisioning code 108. The measurements and the generated output of the provisioning code 108 are used to determine whether the received policies 106 are satisfied. If the policies are satisfied by the measurements of the provisioning code 108 and the output of execution of the provisioning code 108, then the sealed container 110 is unsealed and released to the smart scale 124. If the sealed container 110 is unsealed, then the smart scale 124 installs any software/firmware updates, any applications, or stores any data that is included in the sealed container 110. If the policies 106 are not satisfied, then the smart scale 124 may be compromised and the sealed container 110 is not unsealed. Because the one or more policies are satisfied by the measurements and/or the output, the smart scale 124 self-attests to the integrity of the device.

In some example implementations, the provisioning code 108 is the device specific update that is included in the sealed container 110. In such implementations, the TPM 120 may measure the provisioning code (e.g., software update) in the sealed container (e.g., conduct a hash integrity check, decrypt the provisioning code, etc.) based on the one or more policies 106. In such an implementation, if the policies are satisfied, the provisioning code 108 is released outside the TPM 120, the TEE 118, and/or the trusted computing manager 126 for execution one or more processors of the smart scale 124.

In some example implementations, the one or more polices 106 are further based on code already executable on the device (e.g., operating system/firmware not in the payload 104. In such an example implementation, the policies are based on projected measurements of the code executable on the device in addition to the provisioning code received in the payload 104.

At some point after the payload 104 is sent to the smart scale 124, the provisioning service 102 may initiate a device health attestation check. A measured boot sequence (that measures the boot code sequence stored on the PCRs of the TPM 120) may be securely sent to the provisioning service 102. The provisioning 102 checks the measured boot sequence to determine if the measured boot sequence is correct (e.g., the software is not compromised). If the measured boot sequence is correct, then it is confirmed that the device correctly unsealed the sealed container 110 and installed the data/code. If the measured boot sequence is not correct, then the provisioning service 102 may initiate corrective action with the device. Such corrective action may include, without limitation, instructing the device to wipe all software, bricking the device, or notifying the user that the device is compromised. If the user is notified of the device being compromised, the user may conduct an offline reset of the device or take the device in to a manufacturer or vendor for repairs and/or replacement.

Figure 2:
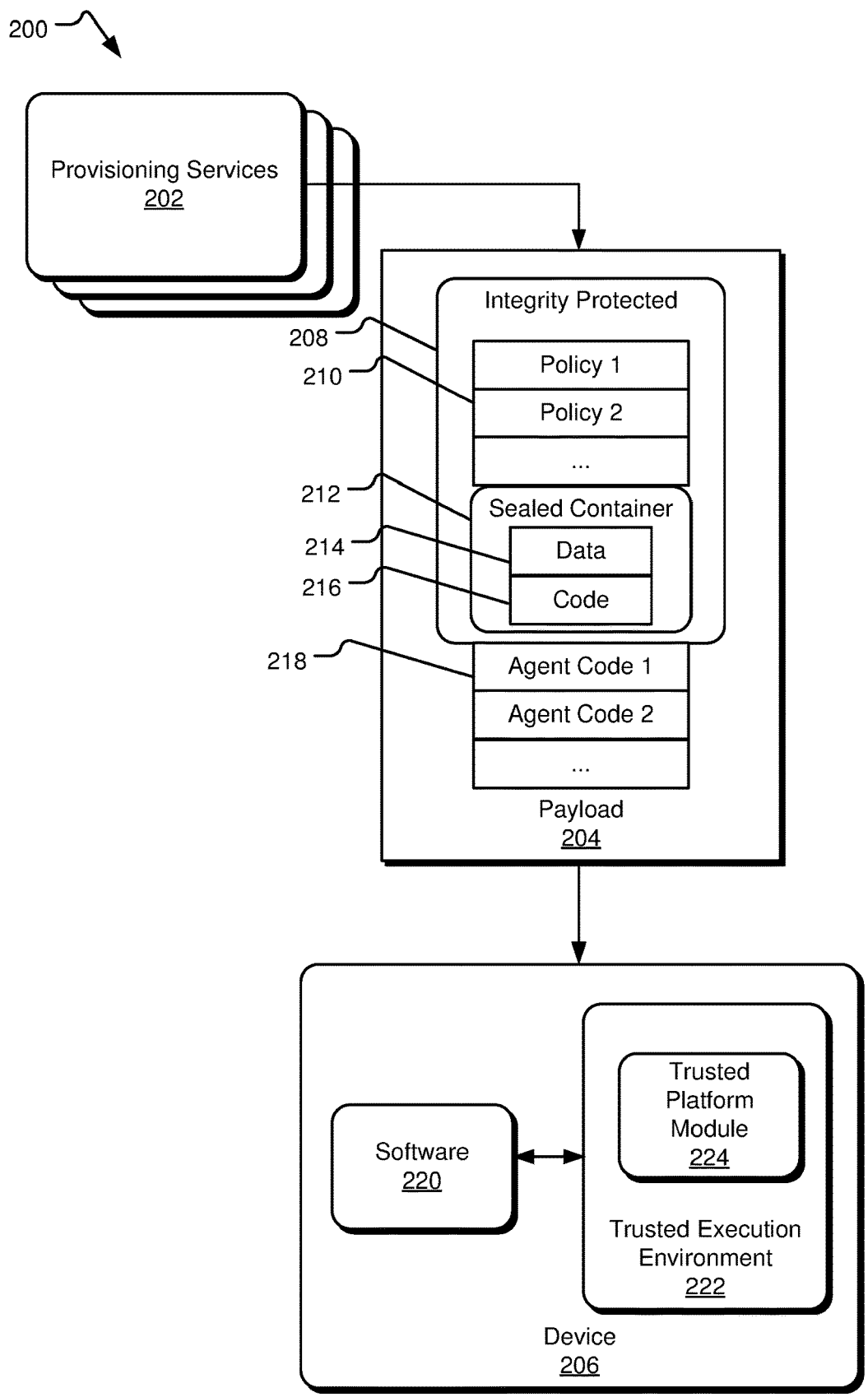
FIG. 2 illustrates another example block diagram of device authentication using policies based on provisioning code.
Figure 3:
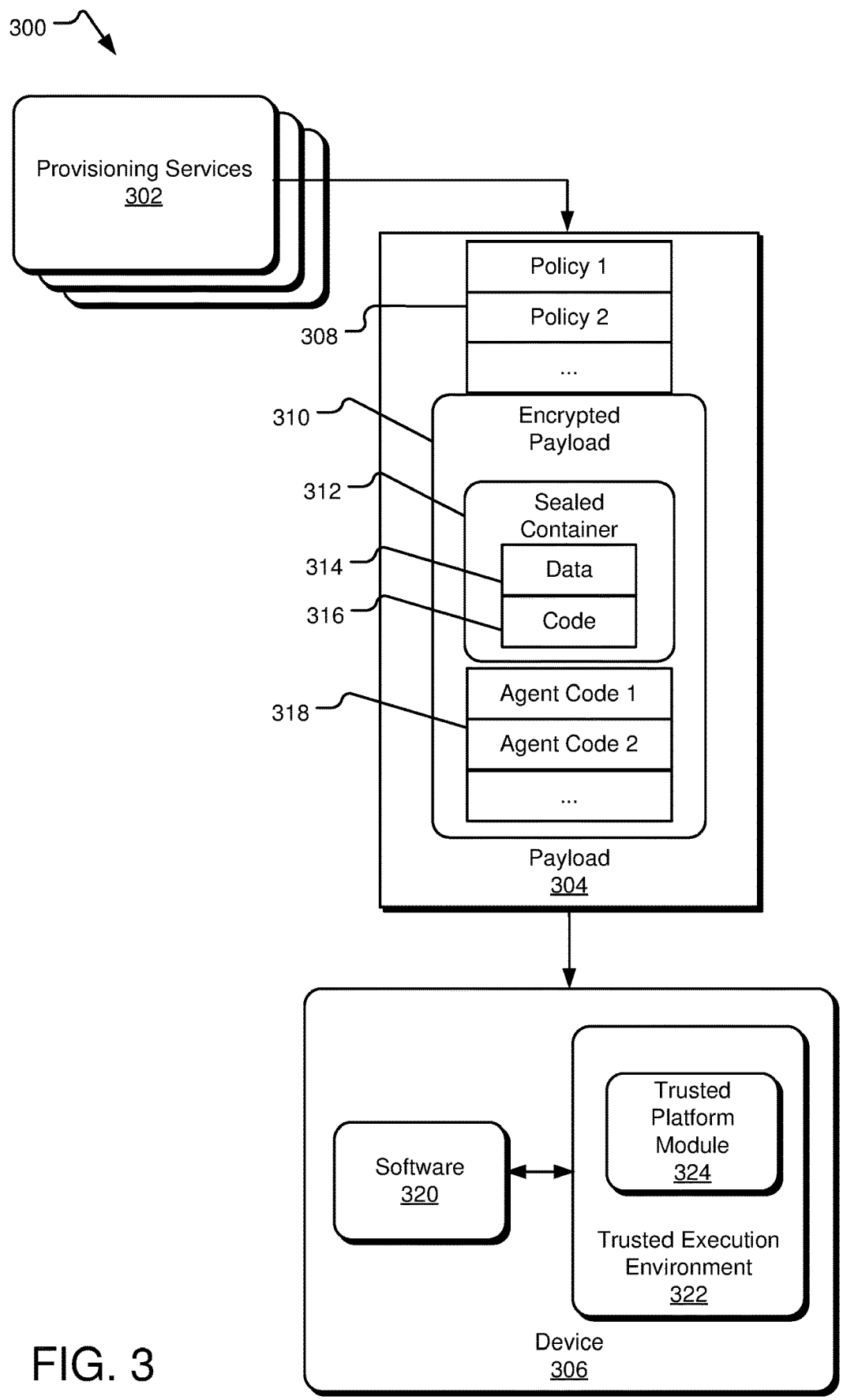
FIG. 3 illustrates another example block diagram of device authentication using policies based on provisioning code.
Figure 4:
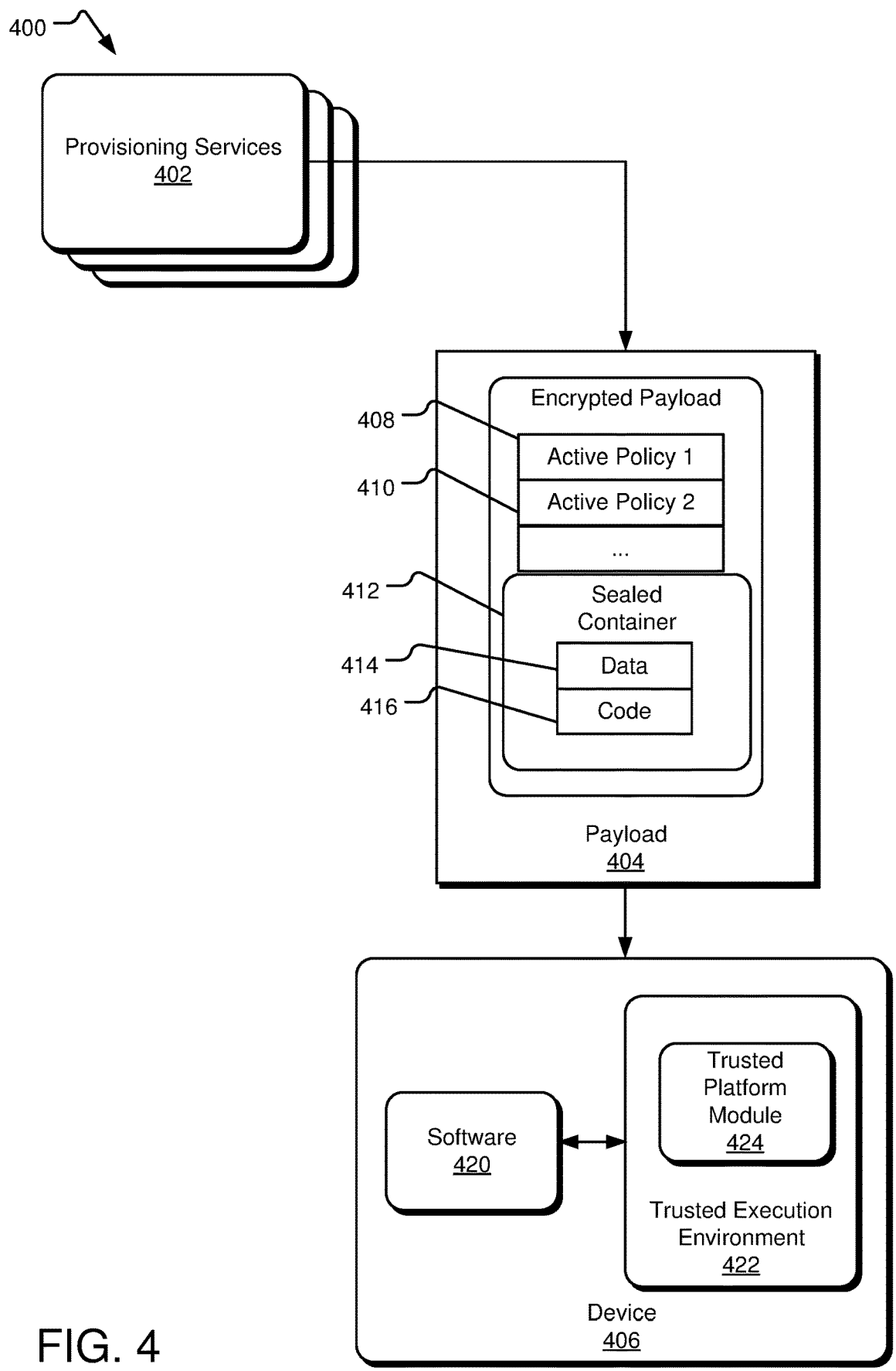
FIG. 4 illustrates another example block diagram of device authentication using policies based on provisioning code.

The above described features allow the provisioning services 102 to push customized code/data to a number of devices and restrict utilization of the code/data based on satisfaction of the policies 106 sent with the payload 104. Furthermore, because the agent code 108 is sent with the payload 104, any infected device is not able to read the agent code to determine potential policy measurements before the agent code 108 is received. In other words, the agent code provides some functionality that the device is not "aware" of before the agent code 108 is received. FIGS. 2-4 illustrate different implementations of securing the payload 104.

FIG. 2 illustrates another example block diagram 200 of device authentication using policies based on provisioning code. The block diagram 200 includes one or more provisioning services 202 (hereinafter "the provisioning service 202") that are configured to provision smart devices, such as the device 206. Provisioning refers to providing tailored configuration data (e.g., device setup information), software/firmware updates, user data, user applications, functionality data, etc. to the devices. The provisioning service 202 may be associated with a manufacturer or a device, a vendor, a stand-alone service, etc. The provisioning service 202 may have access to or manage user accounts and may manage or document ownership of devices using public keys associated with devices.

The block diagram 200 further includes a device 206, which may be a smart device, internet of things (IoT) device, connected device, etc. In one example implementation, the device 206 is a smart scale. The device 206 includes software 220, which may include firmware, operating system code, agent code, etc. The device further includes a trusted platform module (TPM) 224 that executes in a trusted execution environment (TEE) 222. The TPM 224 securely stores passwords, digital keys, and certificates, that provide unique identification and authentication. The TPM 224 may include or have access to non-volatile storage that stores keys and authorization data. The TPM 224 further includes one or more platform configuration registers (PCRs) that store measurements of the software 220 (including agent code segments and firmware). The TPM 224 may further include one or more engines for encryption and hashing. For example, the TPM 224 includes a random number generator, a SHA-1 hashing engine, a key generator, a RSA engine, etc. The TPM 224 further includes an execution engine for executing different functionalities in the TPM 224.

The provisioning service 202 transmit a payload 204 to the device 206. The payload includes a sealed container 212 that includes data 214 and/or code 216 configured for the device 206. The data 214 may be user data, configuration data, etc., and the code 216 may include software/firmware updates, user applications, etc. The sealed container 212 is protected by one or more policies 210. The one or more policies 210 and the sealed container 212 are further part of an integrity protected container 208. They payload 204 further includes one or more agent code segments 218 that are outside the integrity protected container 208 of the payload 204.

The payload 204 is transmitted to the device 206 and the agent code is installed in the software 220. The integrity protected container 208 is processed by the trusted platform module 224 in the trusted execution environment 222. The integrity protected container 208 is protected by a hash algorithm, such as SHA-2. As such, the payload 204 includes a hash value that is encrypted using a public key that is associated with a private key stored in the trusted platform module. Thus, the trusted platform module decrypts the hash value, hashes the integrity protected container 208 (which includes the one or more policies 210 and the sealed container 212) to determine a second hash value. If the hash value and the second hash value match, then the integrity protected container 208 has integrity. In other words, the integrity protected container 208 has not been altered during transmission from the provisioning service 202 to the device 206.

The trusted platform module 224 then takes measurements of the one or more agent code segments 218. Furthermore, the one or more agent code segments 218 are executed, which generates an output. The trusted platform module 224 receives the output and measurements and stores them in the one or more platform configuration registers (PCRs) of the trusted platform module 224. The trusted platform module 224 determines whether the one or more policies 210 are satisfied by the values stored in the one or more PCRs of the trusted platform module 224. If the one or more policies 210 are satisfied, then the sealed container 212 is unsealed and released to the device 206. If the one or more policies 210 are not satisfied, the trusted platform module 224 is unable to unseal the sealed container 212. Accordingly, the data 214 is not stored and/or the code 216 is not installed.

FIG. 3 illustrates another example block diagram 300 of device authentication using policies based on provisioning code. The block diagram 300 includes one or more provisioning services 302 (hereinafter "the provisioning service 302") that are configured to provision smart devices, such as the device 306. Provisioning refers to providing tailored configuration data (e.g., device setup information), software/firmware updates, user data, user applications, functionality data, etc. to the devices. The provisioning service 302 may be associated with a manufacturer or a device, a vendor, a stand-alone service, etc. The provisioning service 302 may have access to or manage user accounts and may manage or document devices using public keys associated with devices.

The block diagram 300 further includes a device 306, which may be a smart device, internet of things (IoT) device, connected device, etc. In one example implementation, the device 306 is a smart scale. The device 306 includes software 320, which may include firmware, operating system code, agent code, etc. The device further includes a trusted platform module (TPM) 324 that executes in a trusted execution environment (TEE) 322. The TPM 324 securely stores passwords, digital keys, and certificates, that provide unique identification and authentication. The TPM 324 may include or have access to non-volatile storage that stores keys and authorization data. The TPM 324 further includes one or more platform configuration registers (PCRs) that store measurements of the software 320 (including agents and firmware). The TPM 324 may further include one or more engines for encryption and hashing. For example, the TPM 324 includes a random number generator, a SHA-1 hashing engine, a key generator, a RSA engine, etc. The TPM 324 further includes an execution engine for executing different functionalities in the TPM 324.

The provisioning service 302 transmit a payload 304 to the device 306. The payload 304 includes one or more policies 308 and an encrypted payload 310. In the payload 304, the one or more policies 308 are outside the encrypted payload 310. The encrypted payload 310 includes a sealed container 312 and one or more agent code segments 318. The sealed container 312 includes data 314 and/or code 316 configured for the device 306. The data 314 may be user data, configuration data, etc., and the code 316 may include software/firmware updates, user applications, etc. The sealed container 312 is protected by the one or more policies 308.

The payload 304 is transmitted to the device 306 and the one or more policies 308 are delivered to the TPM 324. In some implementations, the encrypted payload 310 is encrypted with a public key associated with a private key known by the TPM 324. In some other implementations, the encrypted payload 310 is encrypted with a symmetric key, which itself is encrypted by a public key associated with a private key known by the TPM 324. The TPM 324 utilizes the known private key to decrypt the encrypted payload 310 (or decrypt the symmetric key, which is then used to decrypt the encrypted payload 310). The one or more agent code segments 318 are then released to the software 320.

The trusted platform module 324 then takes measurements of the one or more agent code segments 318. Furthermore, the one or more agent code segments 318 are executed, which generates an output. The trusted platform module 324 receives the output and measurements and stores them in the one or more platform configuration registers (PCRs) of the trusted platform module 324. The trusted platform module 324 determines whether the one or more policies 308 are satisfied by the values stored in the one or more PCRs of the trusted platform module 324. If the one or more policies 308 are satisfied, then the sealed container 312 is unsealed and released to the device 306. If the one or more policies 308 are not satisfied, the trusted platform module 324 is unable to unseal the sealed container 312. Accordingly, the data 314 is not stored and/or the code 316 is not installed.

FIG. 4 illustrates another example block diagram of device authentication using policies based on provisioning code. The block diagram 400 includes one or more provisioning services 402 (hereinafter "the provisioning service 402") that are configured to provision smart devices, such as the device 406. Provisioning refers to providing tailored configuration data (e.g., device setup information), software/firmware updates, user data, user applications, functionality data, etc. to the devices. The provisioning service 402 may be associated with a manufacturer or a device, a vendor, a stand-alone service, etc. The provisioning service 402 may have access to or manage user accounts and may manage or document devices using public keys associated with devices.

The block diagram 400 further includes a device 406, which may be a smart device, internet of things (IoT) device, connected device, etc. In one example implementation, the device 406 is a smart scale. The device 406 includes software 420, which may include firmware, operating system code, agent code, etc. The device further includes a trusted platform module (TPM) 424 that executes in a trusted execution environment (TEE) 422. The TPM 424 securely stores passwords, digital keys, and certificates, that provide unique identification and authentication. The TPM 424 may include or have access to non-volatile storage that stores keys and authorization data. The TPM 424 further includes one or more platform configuration registers (PCRs) that store measurements of the software 420 (including agents and firmware). The TPM 424 may further include one or more engines for encryption and hashing. For example, the TPM 424 includes a random number generator, a SHA-1 hashing engine, a key generator, a RSA engine, etc. The TPM 424 further includes an execution engine for executing different functionalities in the TPM 424.

The provisioning service 402 transmit a payload 404 to the device 406. The payload 404 includes an encrypted payload 408 that includes one or more active policies 410 and a sealed container 412. The sealed container includes data 414 and/or code 416 configured for the device 406. The data 414 may be user data, configuration data, etc., and the code 416 may include software/firmware updates, user applications, etc. The TPM 424 decrypts the encrypted payload 408 using a private key stored in the TPM 424 (or an asymmetric key decrypted using the private key). The one or more active policies are executed by the device 406. If the one or more active policies are executed correctly then the TPM unseals the sealed container 412 and the data 414 and/or code are released to the device 406.

Figure 5:
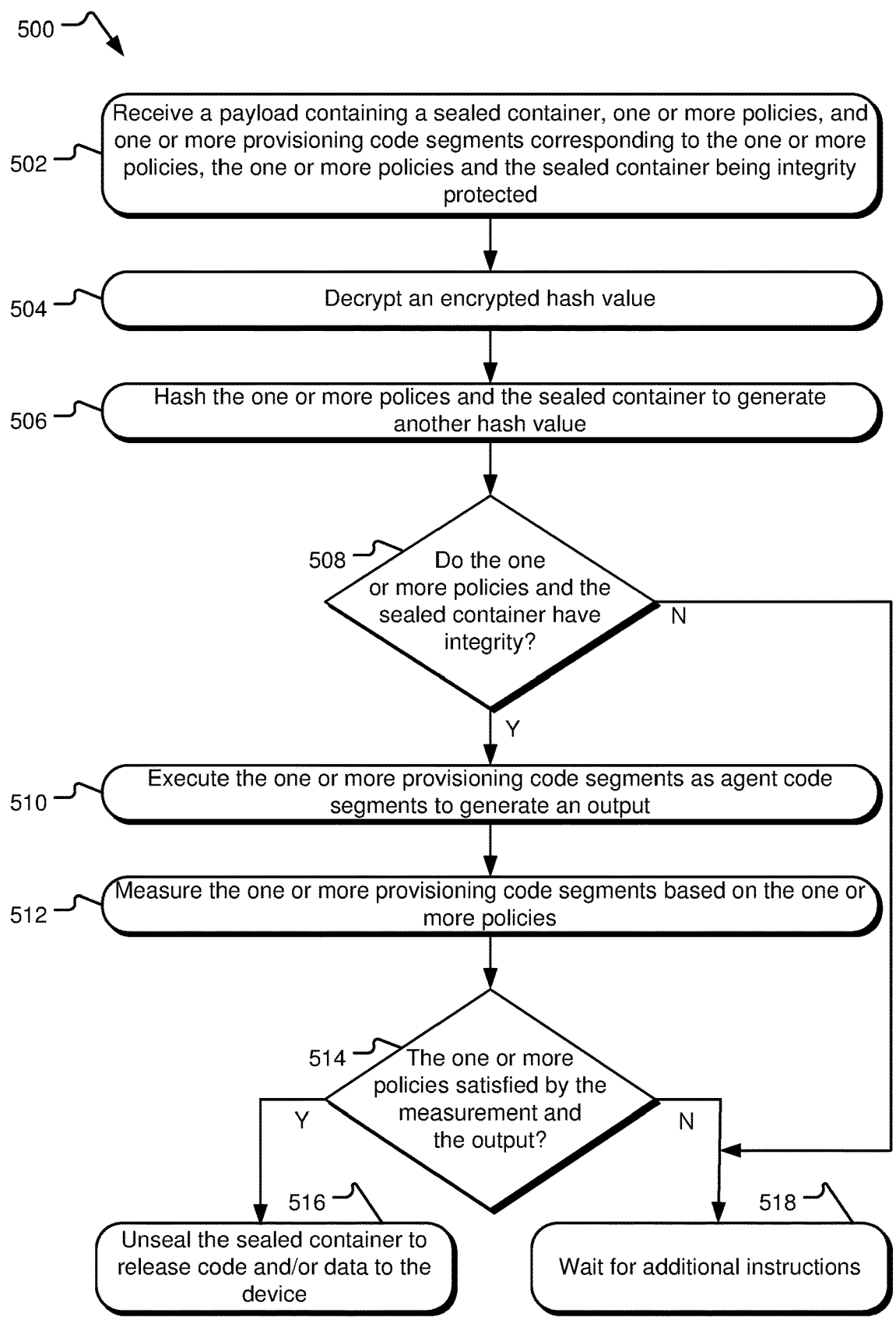
FIG. 5 illustrates example operations for device authentication using policies based on provisioning code.

FIG. 5 illustrates example operations 500 for device authentication using policies based on provisioning code. A receiving operation 502 receives a payload containing a sealed container, one or more policies, and one or more agent code segments corresponding to the one or more policies. The one or more policies and the sealed container are integrity protected. Accordingly, the payload contains an encrypted hash value. The hash value is encrypted using a public key associated with a private key stored on the device. A decrypting operation 504 decrypts the encrypted hash value. A hashing operation 506 hashes the one or more policies and the sealed container to generate another hash value (a new hash value). A determining operation 508 determines whether the one or more policies and the sealed container have integrity. In other words, the determining operation 508 determines whether the one or more policies and the sealed container have been altered by comparing the decrypted hash value to the generated another hash value. If the one or more policies and the sealed container have been altered (e.g., the one or more policies and the sealed container do not have integrity), then the process continues to a waiting operation 518 that waits for additional instructions. Additional instructions may be received from a provisioning service to lock down or wipe the device.

If the one or more policies and the sealed container are not altered (e.g., the one or more policies and the sealed container have integrity/the hash values match), then an executing operation 510 executes the one or more agent code segments to generate an output. A measuring operation 512 measures the one or more agent code segments based on the one or more policies. The generated output and the measurement of the one or more agent code segments may be stored in one or more platform configuration registers (PCRs) of a trusted platform module (TPM) of the device. A determining operation 514 determines whether the one or more policies are satisfied by the measurement and the output. If the policies are not satisfied, then the sealed container is not unsealed and the waiting operation 518 waits for additional instructions. The device may be compromised and the device does not receive any data/code in the sealed container. If the policies are satisfied, the trusted platform module unseals (in an unsealing operation 516) the sealed container (e.g., using a key), and the data/code in the sealed container is released to the device. In other words, the device is not compromised.

Figure 6:
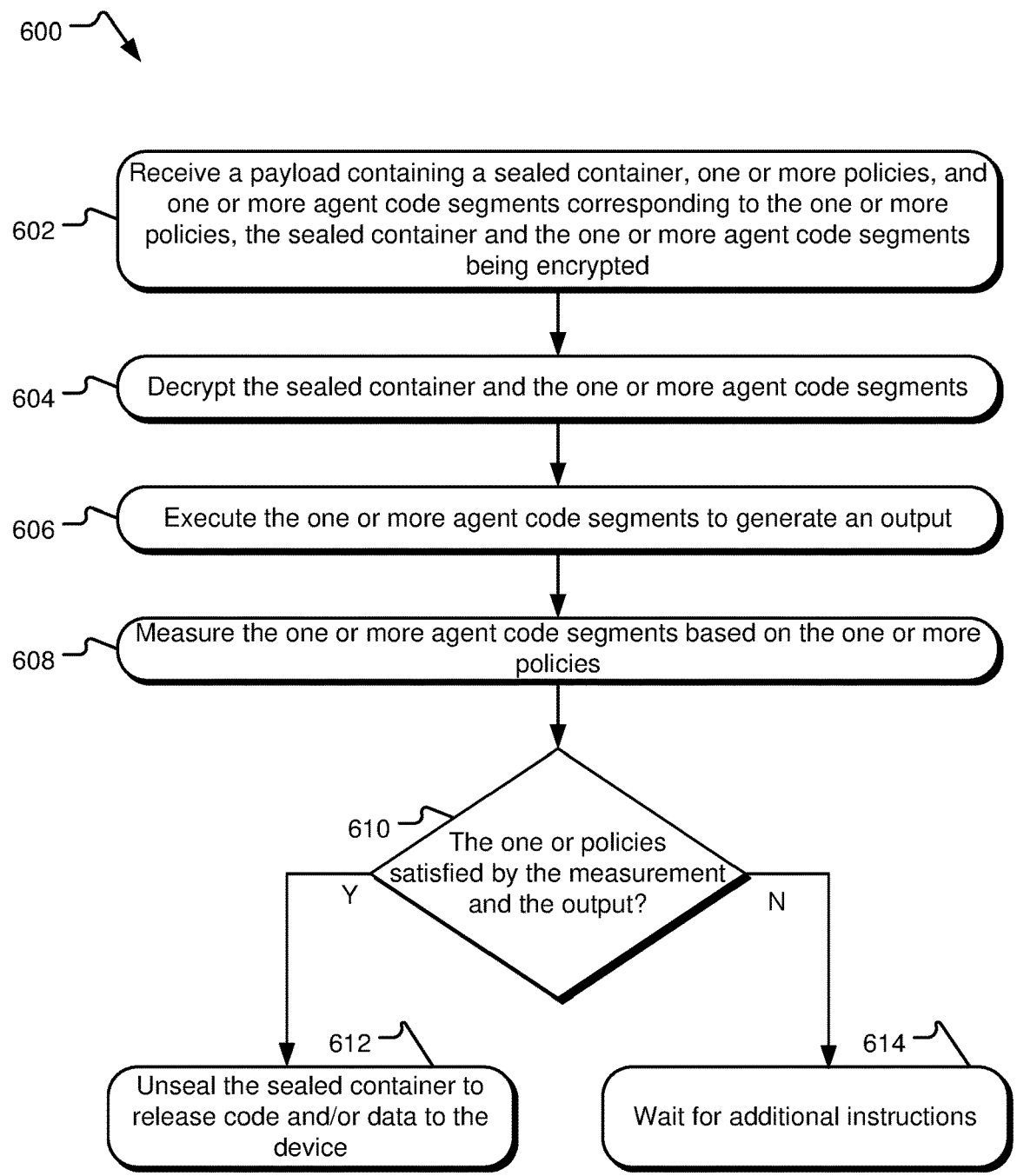
FIG. 6 illustrates example operations for device authentication using policies based on provisioning code.

FIG. 6 illustrates example operations 600 for device authentication using policies based on provisioning code. A receiving operation 602 receives a payload containing a sealed container, one or more policies, and one or more agent code segments corresponding to the one or more policies. The sealed container and the one or more agent code segments are encrypted. In some implementations, the sealed container and the one or more agent code segments are encrypted with a public key associated with a private key known by the trusted platform module (TPM) of the device. In some other implementations, the sealed container and the one or more agent code segments are encrypted with a symmetric key, which itself is encrypted by a public key associated with a private key known by the TPM. The TPM utilizes the known private key in a decrypting operation 604 that decrypts the encrypted sealed container and the one or more agent code segments (or decrypt the symmetric key, which is then used to decrypt the sealed container and the one or more agent code segments). An executing operation 606 executes the one or more agent code segments to generate an output. A measuring operation 608 measures the one or more agent code segments based on the one or more policies. A determining operation 610 determines whether the one or more policies are satisfied by the measurement and the output. If the policies are not satisfied, then the sealed container is not unsealed and a waiting operation 614 waits for additional instructions. The device may be compromised and the device does not receive any data/code in the sealed container. If the policies are satisfied, the trusted platform module unseals (in an unsealing operation 612) the sealed container (e.g., using a key), and the data/code in the sealed container is released to the device. In other words, the device is not compromised.

Figure 7:
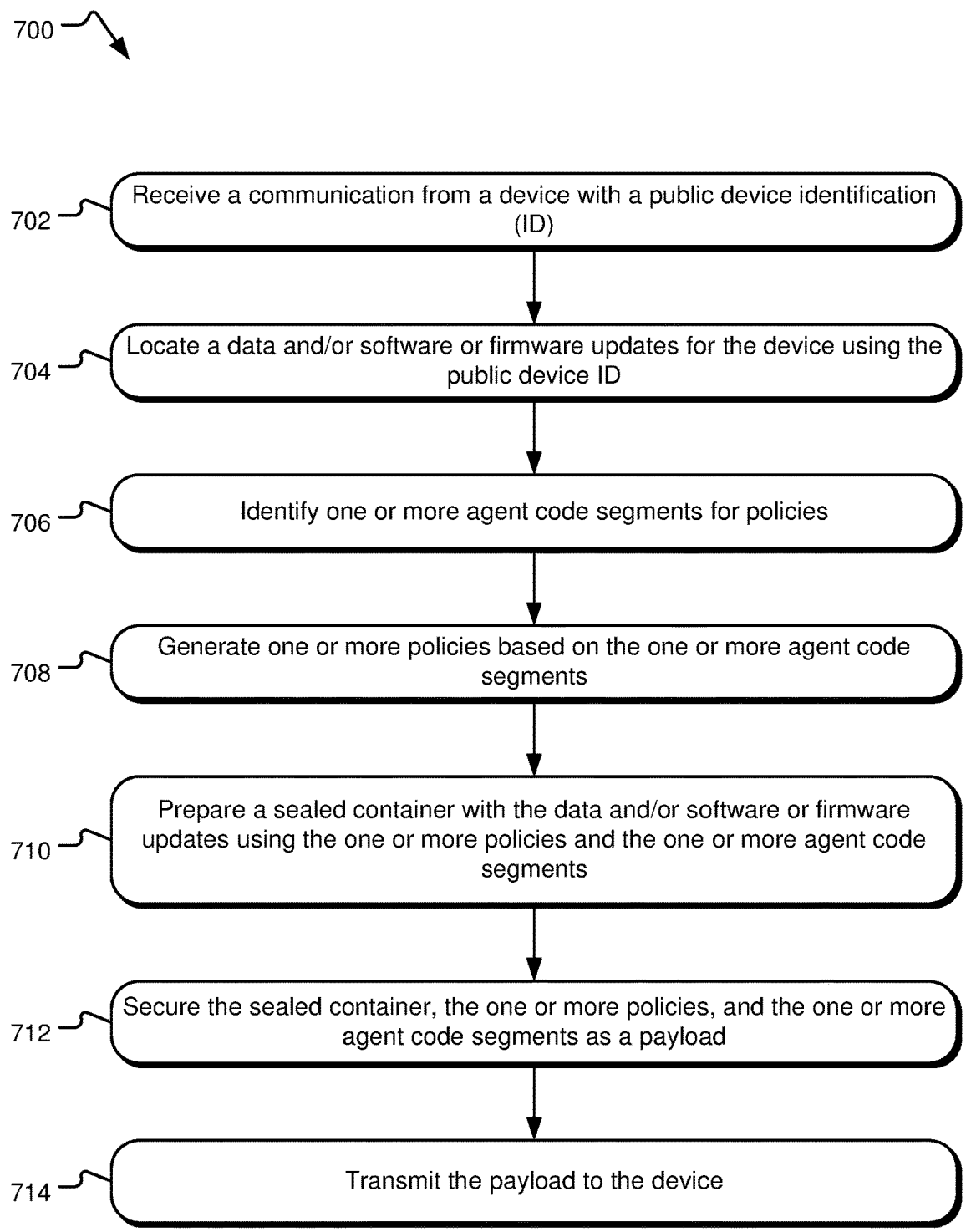
FIG. 7 illustrates example operations for device authentication using policies based on provisioning code.

FIG. 7 illustrates example operations 700 for device authentication using policies based on provisioning code. Specifically, FIG. 7 illustrates the operations from the perspective of a provisioning service. A receiving operation 702 receives a communication from a device with a public device identification. A locating operation 704 locates a data, and/or software or firmware updates for the device using the public device ID. The public device ID may be documented in an ownership record that is connected to a customer account. The data and/or software or firmware updates may be specific to the device and or the customer with the device. Thus, the provisioning service utilizes the ownership record and the connected customer account/profile to generate the data and/or software or firmware updates. The data and/or software or firmware updates may be pre-prepared by the provisioning service and/or generated after the communication is received in the receiving operation 702. Furthermore, the data and/or software or firmware updates may be prepared for the device without receiving a communication in the receiving operation 702.

An identifying operation 706 identifies one or more agent code segments for policies. These agent code segments may be based on the type of device, functionality of the device, etc. A generating operation 708 generates one or more policies based on the one or more agent code segments. The generating operation 708 may include generating an authorization digest by simulating a TPM of the device. The generating operation 708 may further include generating commands for the policies, an authorization command, and/or combining (e.g., generating a hash chain) of the commands using AND and/or OR operations. A preparing operation 710 prepares a sealed container with the data and/or software or firmware updates using the one or more policies and the one or more agent code segments. The preparing operation 710 generating an authorization digest by simulating a TPM of the device. The preparing operation 710 may further include generating commands for the policies, an authorization command, and/or combining (e.g., generating a hash chain) of the commands using AND and/or OR operations.

A securing operation 712 secures the sealed container, the one or more policies, and the one or more agent code segments as a payload. The securing operation 712 may include encrypting (e.g., using the device's public key) one or more of the policies, agent code segments, and the sealed container. The securing operation 712 may further include hashing one of the payload portions to generate a hash value, and encrypting the hash value. A transmitting operation 714 transmits the secured payload to the device. The provision service may subsequently request a device attestation from the device. The device may send a measured boot sequence to the provisioning service. If the measured boot sequence does not satisfy an expected boot sequence, then the provisioning service may take corrective action with the device.

Figure 8:
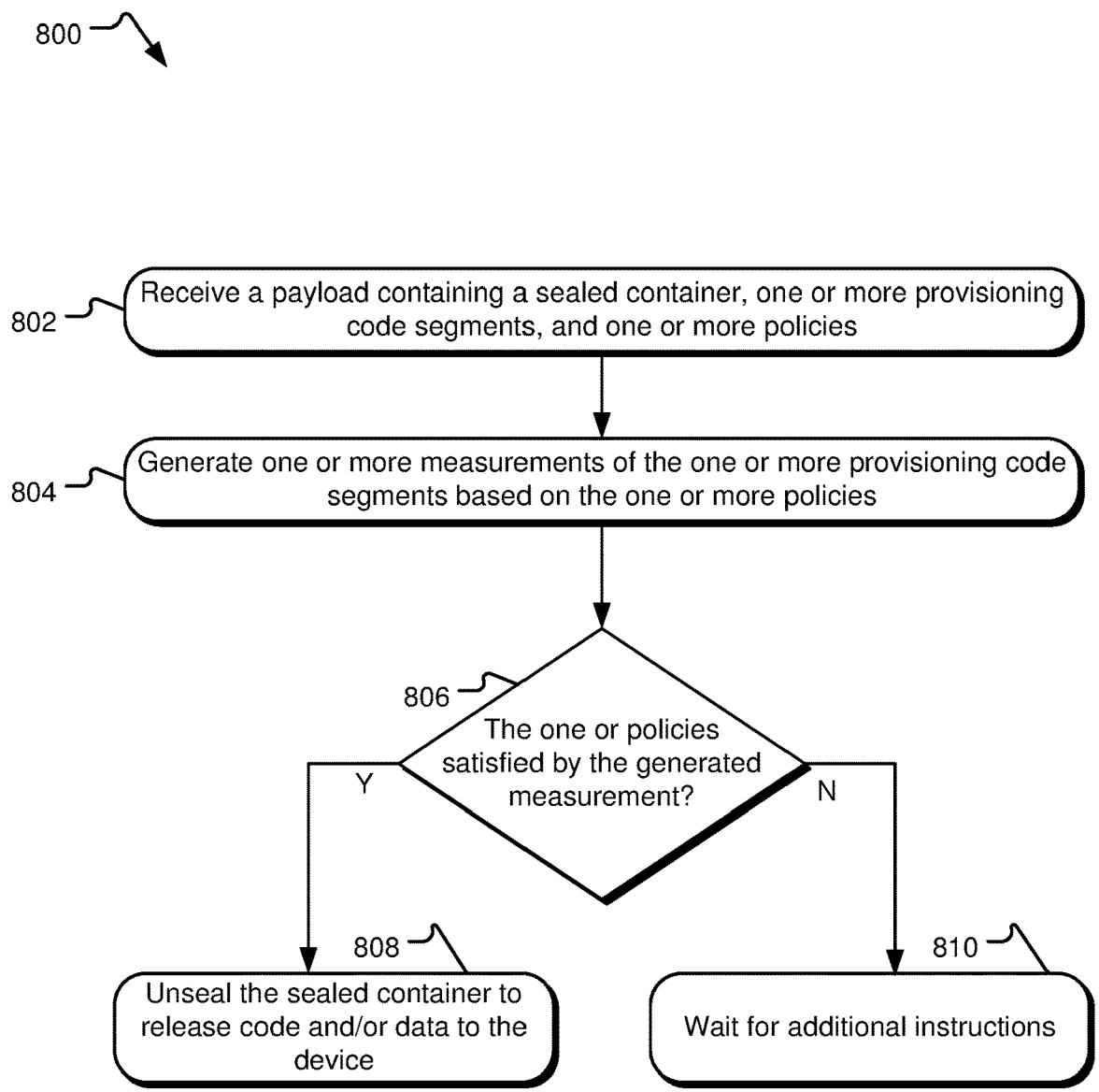
FIG. 8 illustrates example operations for device authentication using policies based on provisioning code.

FIG. 8 illustrates example operations for device authentication using policies based on provisioning code. A receiving operation receives a payload containing a sealed container, one or more provisioning cod segments, and one or more policies. A generating operation 804 generates one or more measurements of the one or more provisioning code segments based on the one or more policies. The generating operation may be performed by a trusted computing manager and/or a trusted executing operation. A determining operation 806 determines whether the one or more policies are satisfied by the generated measurement. If the policies are satisfied by the generated measurement, an unsealing operation 808 unseals the sealed container to release the code and/or data to the device. If the policies are not satisfied, a waiting operation 810 waits for additional instructions. The additional instructions may include a device attestation check by an attestation service (e.g., determines whether the code/and or data is installed), or another device/service. The device or user may receive a notification indicating the device has been compromised and corrective action should be taken.

In some example implementations, the one or more provisioning code segments are the code segments included in the sealed container. In such an implementation, the policies may indicate certain operations to perform on the provisioning code segments (e.g., hash, decrypt, etc.). If the operations are performed by the device (e.g., a trusted platform module, trusted execution environment, and/or a trusted computing manager), then the policies are satisfied and the provisioning code is released to execute on the device.

Figure 9:
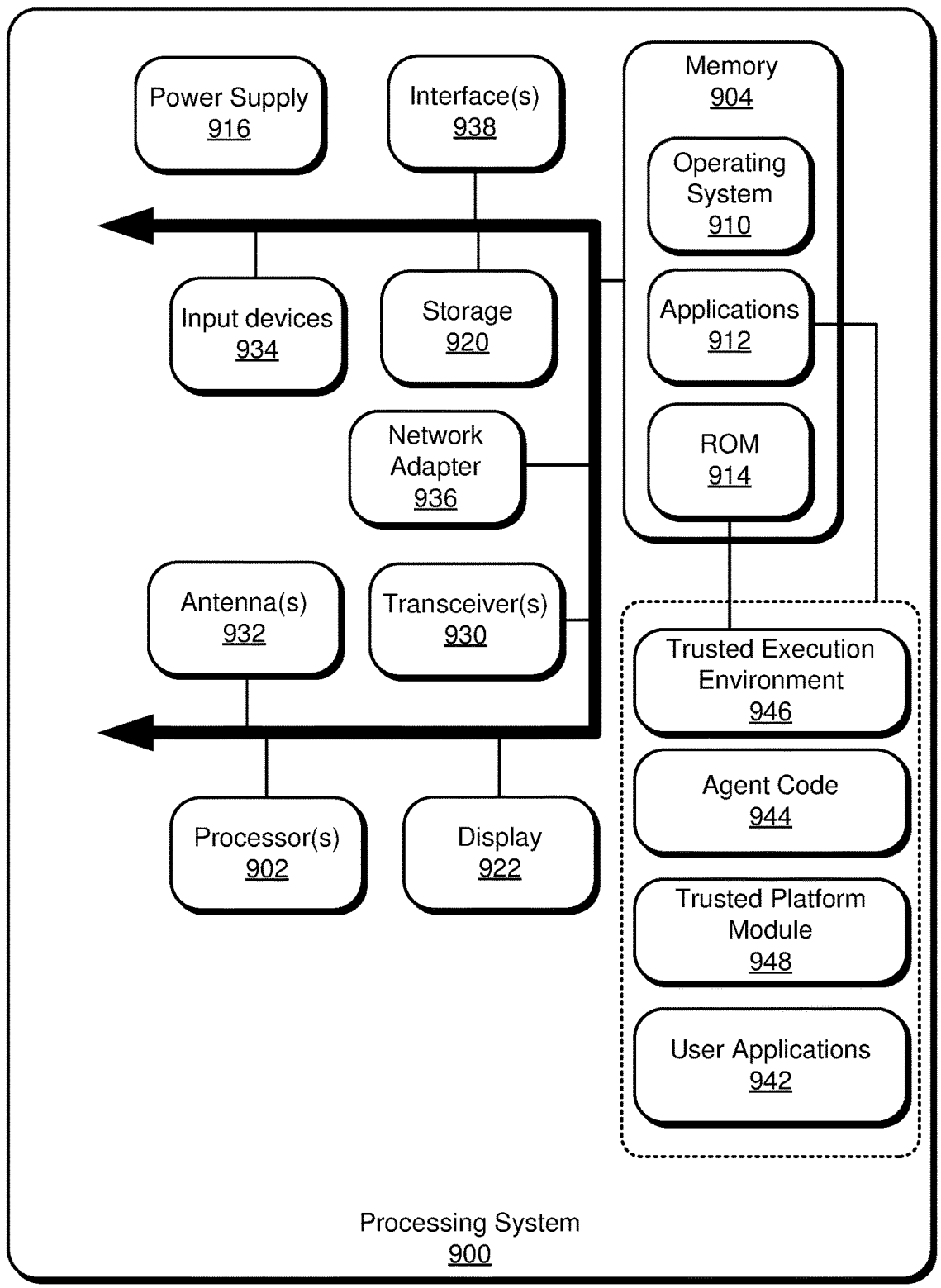
FIG. 9 illustrates an example device that may be useful in implementing the described technology.

FIG. 9 illustrates an example system (labeled as a processing system 900) that may be useful in implementing the described technology. The processing system 900 may be a client device, such as a laptop, mobile device, desktop, tablet, or a server/cloud device. The processing system 900 includes one or more processor(s) 902, and a memory 904. The memory 904 generally includes both volatile memory (e.g., RAM) and non-volatile memory (e.g., flash memory). An operating system 910 resides in the memory 904 and is executed by the processor 902. The memory 904 includes a read only memory (ROM) 914, which may be a write once, read many (WORM) memory.

One or more application programs 912 modules or segments, such as user applications 942, agent code 944, a trusted execution environment 946, and a trusted platform module 948, a trusted computing manager (not shown) are loaded in the memory 904 and/or storage 920 and executed by the processor 902. Firmware, one or more agents, a payload interface, and a policy manager (not shown) may also be loaded in the memory 904 and executed by the processor 902. The trusted execution environment 946 is stored in the ROM 914 (or WORM) and executed by the processor 902. Data, such as user data, digests, measurements, keys, passwords, root secrets, etc. may be stored in the memory 904 or storage 920 and may be retrievable by the processor 902 for use in the by the user applications 942, the agent code 944, the trusted execution environment 946, the trusted platform module 948, etc. The storage 920 may be local to the processing system 900 or may be remote and communicatively connected to the processing system 900 and may include another server. The storage 920 may store resources that are requestable by client devices (not shown).

The processing system 900 includes a power supply 916, which is powered by one or more batteries or other power sources and which provides power to other components of the processing system 900. The power supply 916 may also be connected to an external power source that overrides or recharges the built-in batteries or other power sources.

The processing system 900 may include one or more communication transceivers 930 which may be connected to one or more antenna(s) 932 to provide network connectivity (e.g., mobile phone network, Wi-Fi®, Bluetooth®, etc.) to one or more other servers and/or client devices (e.g., mobile devices, desktop computers, or laptop computers). The processing system 900 may further include a network adapter 936, which is a type of communication device. The processing system 900 may use the network adapter 936 and any other types of communication devices for establishing connections over a wide-area network (WAN) or local-area network (LAN). It should be appreciated that the network connections shown are exemplary and that other communications devices and means for establishing a communications link between the processing system 900 and other devices may be used.

The processing system 900 may include one or more input devices 934 such that a user may enter commands and information (e.g., a keyboard or mouse). These and other input devices may be coupled to the server by one or more interfaces 938, such as a serial port interface, parallel port, universal serial bus (USB), etc. The processing system 900 may further include a display 922, such as a touch screen display.

The processing system 900 may include a variety of tangible processor-readable storage media and intangible processor-readable communication signals. Tangible processor-readable storage can be embodied by any available media that can be accessed by the processing system 900 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information, such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 900. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media, such as a wired network or direct-wired connection, and wireless media, such as acoustic, RF, infrared, and other wireless media.

An example device includes one or more processors, a payload interface executable by the one or more processors, and a trusted computing manager executable by the one or more processors. The payload interface is executable to receive a payload containing a sealed container, one or more provisioning code segments, and one or more policies, the one or more policies being based on the one or more provisioning code segments and corresponding to the sealed container. The trusted computing manager is executable to generate one or more measurements of the one or more provisioning code segments according to the one or more policies, to determine whether the generated one or more measurements satisfy the one or more policies, and to unseal the sealed container responsive to the generated one or more measurements satisfying the one or more policies received in the payload, satisfaction of the one or more policies confirming integrity of the device.

Another example device of any preceding device further includes the sealed container and the one or more policies being protected by a hash value and hash algorithm, the hash value being encrypted using a public key associated with a private key stored in the TPM, the trusted computing manager further configured to decrypt the hash value using the private key stored on the TPM and associated with the public key used to encrypt the hash value, hash the one or more policies and the sealed container to generate a new hash value; compare the hash value the new hash value to determine integrity of the sealed container and the one or more policies.

Another example device of any preceding device further includes the sealed container and the one or more agent code segments being encrypted using a public key associated with a private key stored in the TPM, the trusted computing manager further configured to decrypt the sealed container and the one or more agent code segments using the private key stored in the TPM.

Another example device of any preceding device further includes the one or more provisioning code segments being active policies executable by the device to satisfy the one or more policies.

Another example device of any preceding device further includes the trusted computing manager including a firmware based trusted platform module (TPM) executed in a trusted execution environment (TEE) of the device.

Another example device of any preceding device further includes the one or more policies being further based on one or more projected measurements of code executable on the device.

Another example device of any preceding device further includes the one or more provisioning code segments including one or more agent code segments, the one or more agent code segments being executed to generate an output, the generated output being used to determine whether the one or more policies are satisfied.

An example method includes receiving, at the device, a payload containing a sealed container, one or more provisioning code segments, and one or more policies, the one or more policies being based on the one or more provisioning code segments and corresponding to the sealed container, generating, at the device one or more measurements of the one or more provisioning code segments based on the one or more policies, and unsealing, at the device, the sealed container for the device responsive to determining that the generated one or more measurements satisfy the one or more policies, satisfaction of the one or more policies confirming integrity of the device.

Another example method of any preceding method further includes the sealed container and the one or more policies being protected by a hash value and hash algorithm, the hash value being encrypted using a public key associated with a private key stored a trusted platform module (TPM) of the device, method further includes decrypting the hash value using the private key stored on the TPM and associated with the public key used to encrypt the hash value, hashing the one or more policies and the sealed container to generate a new hash value, and comparing the hash value the new hash value to determine integrity of the sealed container and the one or more policies.

Another example method of any preceding method further includes the sealed container and the one or more provisioning code segments being encrypted using a public key associated with a private key stored in a trusted platform module (TPM) of the device, the method further includes decrypting the sealed container and the one or more provisioning code segments using the private key stored in the TPM.

Another example method of any preceding method further includes the one or more provisioning code segments being active policies executable by the device to satisfy the one or more policies.

Another example method of any preceding method further includes the device including a firmware based platform module (TPM) executed in a trusted execution environment of the device.

Another example method of any preceding method further includes the sealed container being configured for the device based on a public key associated with the device used to manage ownership of the device by a provisioning service.

Another example method of any preceding method further includes the one or more provisioning code segments including one or more agent code segments, the one or more agent code segments being executed to generate an output, the generated output being used to determine whether the one or more policies are satisfied.

Another example method of any preceding method further includes the one or more policies being further based on one or more projected measurements of code executable on the device, the code executable on device stored on the device prior to receiving the payload.

Any example system includes means for receiving, at the device, a payload containing a sealed container, one or more provisioning code segments, and one or more policies, the one or more policies being based on the one or more provisioning code segments and corresponding to the sealed container, means for generating, at the device one or more measurements of the one or more provisioning code segments based on the one or more policies, and unsealing, at the device, the sealed container for the device responsive to determining that the generated one or more measurements satisfy the one or more policies, satisfaction of the one or more policies confirming integrity of the device.

Another example system of any preceding system includes means for the sealed container and the one or more policies being protected by a hash value and hash algorithm, the hash value being encrypted using a public key associated with a private key stored a trusted platform module (TPM) of the device, the system further includes means for decrypting the hash value using the private key stored on the TPM and associated with the public key used to encrypt the hash value, means for hashing the one or more policies and the sealed container to generate a new hash value, and means for comparing the hash value the new hash value to determine integrity of the sealed container and the one or more policies.

Another example system of any preceding system includes means for the sealed container and the one or more provisioning code segments being encrypted using a public key associated with a private key stored in a trusted platform module (TPM) of the device, the system further includes means for decrypting the sealed container and the one or more provisioning code segments using the private key stored in the TPM.

Another example system of any preceding system includes means for the one or more provisioning code segments being active policies executable by the device to satisfy the one or more policies.

Another example system of any preceding system includes means for the device including a firmware based platform module (TPM) executed in a trusted execution environment of the device.

Another example system of any preceding system includes means for the sealed container being configured for the device based on a public key associated with the device used to manage ownership of the device by a provisioning service.

Another example system of any preceding system includes means for the one or more provisioning code segments including one or more agent code segments, the one or more agent code segments being executed to generate an output, the generated output being used to determine whether the one or more policies are satisfied.

Another example system of any preceding system includes means for the one or more policies being further based on one or more projected measurements of code executable on the device, the code executable on device stored on the device prior to receiving the payload.

An example one or more tangible processor-readable storage media embodied with instructions for executing on one or more processors and circuits of a device a process includes receive a payload containing a sealed container, one or more provisioning code segments, and one or more policies, the one or more policies being based on the one or more provisioning code segments and corresponding to the sealed container, generating one or more measurements of the one or more provisioning code segments based on the one or more policies, and unsealing the sealed container for the device responsive determining that the generated one or more measurements satisfy the one or more policies, satisfaction of the one or more policies confirming integrity of the device.

Another example one or more tangible processor-readable storage media embodied with instructions for executing on one or more processors and circuits of a device a process of any preceding process further includes the sealed container and the one or more policies are protected by a hash value and hash algorithm, the hash value being encrypted using a public key associated with a private key stored in a trusted platform module (TPM) of the device. The process further includes decrypting the hash value using the private key stored on the TPM and associated with the public key used to encrypt the hash value, hashing the one or more policies and the sealed container to generate a new hash value, and comparing the hash value the new hash value to determine integrity of the sealed container and the one or more policies.

Another example one or more tangible processor-readable storage media embodied with instructions for executing on one or more processors and circuits of a device a process of any preceding process further includes the sealed container and the one or more provisioning code segments being encrypted using a public key associated with a private key stored in a trusted platform module (TPM) of the device. The process further includes decrypting the sealed container and the one or more provisioning code segments using the private key stored in the TPM.

Another example one or more tangible processor-readable storage media embodied with instructions for executing on one or more processors and circuits of a device a process of any preceding process further includes the device including a firmware based trusted platform module (TPM) executed in a trusted execution environment.

Another example one or more tangible processor-readable storage media embodied with instructions for executing on one or more processors and circuits of a device a process of any preceding process further includes the one or more provisioning code segments including one or more agent code segments, the one or more agent code segments being executed to generate an output, the generated output being used to determine whether the one or more policies are satisfied.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A smart device comprising:
   one or more hardware processors;
   a payload interface executable by the one or more hardware processors to receive a payload containing a sealed container, one or more provisioning code segments outside the sealed container, and one or more policies located outside the sealed container, the one or more policies being based on the one or more provisioning code segments and corresponding to the sealed container; and
   a trusted computing manager, executable by the one or more hardware processors to generate one or more measurements of the one or more provisioning code segments according to the one or more policies, to determine whether the generated one or more measurements satisfy the one or more policies based on the one or more measurements and an output of execution of the one or more provisioning code segments, wherein the one or more provisioning code segments located outside the sealed container being executed by the smart device and generate the output which is used by a trusted platform module (TPM) of the trusted computing manager to unseal the sealed container responsive to the generated one or more measurements and the output of the execution being determined by the TPM to satisfy the one or more policies received in the payload, satisfaction of the one or more policies confirming integrity of the smart device.

2. The device of claim 1 wherein the sealed container and the one or more policies are protected by a hash value and hash algorithm, the hash value being encrypted using a public key associated with a private key stored in the trusted platform module (TPM) of the device, the trusted computing manager further executable to decrypt the hash value using the private key stored on the TPM and associated with the public key used to encrypt the hash value, hash the one or more policies and the sealed container to generate a new hash value; compare the hash value the new hash value to determine integrity of the sealed container and the one or more policies.

3. The device of claim 1 wherein the sealed container and the one or more agent code segments are encrypted using a public key associated with a private key stored in the trusted platform module (TPM), the trusted computing manager further executable to decrypt the sealed container and the one or more agent code segments using the private key stored in the TPM.

4. The device of claim 1 wherein the one or more provisioning code segments are active policies executable by the device to satisfy the one or more policies.

5. The device of claim 1 wherein the trusted computing manager includes a firmware based trusted platform module (TPM) executed in a trusted execution environment (TEE) of the device.

6. The device of claim 1 wherein the one or more policies are further based on one or more projected measurements of code executable on the device, the code executable on device stored on the device prior to receiving the payload.

7. The device of claim 1 wherein the trusted computing manager is executable by the one or more processors to receive an authorization command, create a TPM policy digest, and determine whether the TPM policy digest matches an authorization policy digest and wherein the authorization command unseals the sealed container if the TPM policy digest matches the authorization policy digest.

8. A method of confirming integrity of a smart device comprising:
receiving, at the smart device, a payload containing a sealed container, one or more provisioning code segments located outside the sealed container, and one or more policies located outside the sealed container, the one or more policies being based on the one or more provisioning code segments and corresponding to the sealed container;
generating, at the smart device, one or more measurements of the one or more provisioning code segments based on the one or more policies;
executing the one or more provisioning code segments located outside the sealed container by the smart device to generate an output; and
unsealing, at a trusted platform module (TPM) of a trusted computing manager of the smart device, the sealed container for the smart device responsive to determining by the TPM that the generated one or more measurements and the generated output satisfy the one or more policies based on an output of execution of the one or more provisioning code segments, satisfaction of the one or more policies confirming integrity of the smart device.

9. The method of claim 8 wherein the sealed container and the one or more policies are protected by a hash value and hash algorithm, the hash value being encrypted using a public key associated with a private key stored in the trusted platform module (TPM) of the device, method further comprising:
decrypting the hash value using the private key stored on the TPM and associated with the public key used to encrypt the hash value;
hashing the one or more policies and the sealed container to generate a new hash value; and
comparing the hash value with the new hash value to determine integrity of the sealed container and the one or more policies.

10. The method of claim 8, wherein the sealed container and the one or more provisioning code segments are encrypted using a public key associated with a private key stored in the trusted platform module (TPM) of the device, the method further comprising:
decrypting the sealed container and the one or more provisioning code segments using the private key stored in the TPM.

11. The method of claim 8 wherein the one or more provisioning code segments are active policies executable by the device to satisfy the one or more policies.

12. The method of claim 8 wherein the device includes a firmware based platform module (TPM) executed in a trusted execution environment of the device.

13. The method of claim 8 wherein the sealed container is configured for the device based on a public key associated with the device used to manage ownership of the device by a provisioning service.

14. The method of claim 8 wherein the one or more policies are further based on one or more projected measurements of code executable on the device, the code executable on device stored on the device prior to receiving the payload.

15. The method of claim 8 further comprising:
receiving an authorization command at the trusted platform module (TPM), and wherein the generating includes creating a TPM policy digest based on the authorization command; and
determining whether the TPM policy digest matches an authorization policy digest; and
wherein if the TPM policy digest matches an authorization policy digest, the unsealing is in response to the authorization command.

16. One or more processor-readable storage media device embodied with instructions for executing on one or more hardware processors and circuits of a smart device a process comprising:
receiving a payload containing a sealed container, one or more provisioning code segments located outside the sealed container, and one or more policies located outside the sealed container, the one or more policies being based on the one or more provisioning code segments and corresponding to the sealed container;
generating one or more measurements of the one or more provisioning code segments based on the one or more policies;

executing the one or more provisioning code segments located outside the sealed container by the smart device to generate an output; and unsealing, at a trusted platform module (TPM) of a trusted computing manager of the smart device, the sealed container for the smart device responsive to determining by the TPM that the generated one or more measurements and the output satisfy the one or more policies based on an output of execution of the one or more provisioning code segments, satisfaction of the one or more policies confirming integrity of the smart device.

17. The one or more tangible processor-readable storage device of claim 16 wherein the sealed container and the one or more policies are protected by a hash value and hash algorithm, the hash value being encrypted using a public key associated with a private key stored in the trusted platform module (TPM) of the device, process further comprising:

decrypting the hash value using the private key stored on the TPM and associated with the public key used to encrypt the hash value;

hashing the one or more policies and the sealed container to generate a new hash value; and comparing the hash value with the new hash value to determine integrity of the sealed container and the one or more policies.

18. The one or more tangible processor-readable storage device of claim 16 wherein the sealed container and the one or more provisioning code segments are encrypted using a public key associated with a private key stored in the trusted platform module (TPM) of the device, the process further comprising:

decrypting the sealed container and the one or more provisioning code segments using the private key stored in the TPM.

19. The one or more tangible processor-readable storage device of claim 16 wherein the device includes a firmware based trusted platform module (TPM) executed in a trusted execution environment.

20. The one or more tangible processor-readable storage device of claim 19, the process further comprising:

receiving an authorization command at the TPM, wherein the generating includes creating a TPM policy digest based on the authorization command; and determining whether the TPM policy digest matches an authorization policy digest; and wherein if the TPM policy digest matches an authorization policy digest, the unsealing is in response to the authorization command.

* * * * *